United States Patent [19]

Ando

[11] 4,134,032
[45] Jan. 9, 1979

[54] AUDIO SIGNAL DISCRIMINATOR CIRCUIT

[75] Inventor: Shizuo Ando, Kawagoe, Japan

[73] Assignee: Pioneer Electronic Corporation, Tokyo, Japan

[21] Appl. No.: 795,843

[22] Filed: May 11, 1977

[30] Foreign Application Priority Data

May 12, 1976 [JP] Japan .................................. 51-53941

[51] Int. Cl.² .............................................. H03K 5/20
[52] U.S. Cl. ..................................... 307/351; 307/353
[58] Field of Search ................. 307/351, 353; 328/151

[56] References Cited

U.S. PATENT DOCUMENTS

| | | | |
|---|---|---|---|
| 3,609,407 | 9/1971 | Garuts | 307/351 X |
| 3,810,025 | 5/1974 | Barthelemy | 328/151 X |
| 3,982,434 | 9/1976 | McMurtrie | 307/351 X |
| 4,028,506 | 6/1977 | Araseki et al. | 307/351 X |

*Primary Examiner*—John S. Heyman

*Attorney, Agent, or Firm*—Sughrue, Rothwell, Mion, Zinn and Macpeak

[57] ABSTRACT

An audio signal discriminator circuit wherein the discrimination of audio signal is effected by utilizing the difference in peak level changing mode between audio signals and other signals, such as dial tone signals, beep tone signals and the like, comprises a rectifier circuit for rectifying input signals, a voltage hold circuit for holding an output peak voltage of the rectifier circuit, a voltage comparator circuit for comparing the peak voltage held in the voltage hold circuit with the following peak voltages to produce an output signal when the following peak value is relatively high, a time switch for producing an output signal when no reset signal is applied thereto for a predetermined time period, and a gate circuit for transmitting the output signal of said rectified circuit as a reset pulse to the time switch in response to the output signal of the voltage comparator circuit.

8 Claims, 6 Drawing Figures

AUDIO SIGNAL DISCRIMINATOR CIRCUIT

BACKGROUND OF THE INVENTION

The present invention relates to an audio signal discriminator circuit for use in automatic telephone recording apparatus.

In automatic telephone recording apparatus, it is the practice to start its recording operation in response to an incoming telephone call signal and stop the operation at the end of the call signal by the use of an audio signal discriminator circuit having a function of distinguishing audio signals from other signals such as dialed tones, beep tones, howler tones, etc. incoming from the telephone line.

An audio signal discriminator circuit has been proposed in the art in which the statistical property of audio signals is utilized so that audio signals are distinguished from other signals in accordance with the duration of the signal kept in a range higher than a predetermined level. Such an apparatus, however, is not free from misoperations.

SUMMARY OF THE INVENTION

The present invention has for its object to provide one satisfactory solution of the technical problems encountered in the conventional apparatus by providing an improved audio signal discriminator circuit which can certainly distinguish audio signals from other signals such as dialed tones, beep tones, howler tones, etc. In accordance with the present invention, the discrimination of audio signals is effected by utilizing the difference in peak level change mode between audio signals and other signals.

DESCRIPTION OF THE PREFERRED EMBODIMENTS

The preferred embodiment of the invention will now be described in detail with reference to the following description taken in connection with the accompanying drawings.

Figure 1:
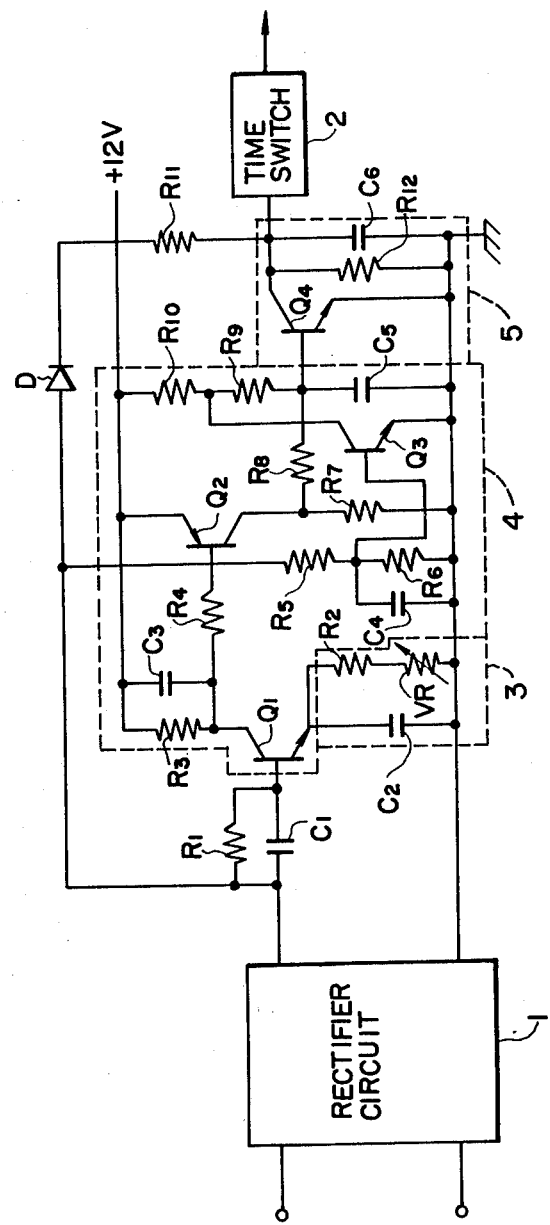
FIG. 1 is a circuit diagram showing one embodiment of the present invention.

Referring to FIG. 1, there is shown an audio signal discriminator circuit according to the present invention which includes a rectifier circuit 1 for rectifying signals coming from the telephone line. The output of the rectifier circuit 1 is coupled through a parallel circuit of a resistor $R_1$ and a capacitor $C_1$ to the base of a transistor $Q_1$ and further to a charge and discharge circuit 3 composed of a capacitor $C_2$, a resistor $R_2$ and a variable resistor VR in which the applied voltage is held. The charge and discharge circuit 3 has a relatively high time constant and forms a voltage hold circuit so that the transistor $Q_1$ conducts only when a peak value following a certain peak value of the output of the rectifier circuit is relatively high. To the collector of the transistor $Q_1$ there is applied a positive voltage through a parallel circuit of a resistor $R_3$ and a capacitor $C_3$. The voltage change at the collector of the transistor $Q_1$ is coupled through a resistor $R_4$, a transistor $Q_2$, and a circuit of resistors $R_7$ and $R_8$ to the base of a transistor $Q_4$. The circuit to control the transistor $Q_4$ forms a voltage comparator circuit 4 which makes the transistor $Q_4$ conductive when it receives from the rectifier circuit a voltage higher than the voltage held in the voltage hold circuit.

The transistor $Q_4$ has its emitter connected to the ground and its collector connected through a diode D and a resistor $R_{11}$ to the output terminal of the rectifier circuit 1. A capacitor $C_6$ is connected between the emitter and collector of the transistor $Q_4$ to delay the rise of the signal from the rectifier circuit 1. $R_{12}$ indicates a discharge resistor for the capacitor $C_6$.

The collector of the transistor $Q_4$ is connected to the input terminal of a time switch 2 which is adapted to generate its output when no reset pulse is applied thereto for a certain period.

The transistor $Q_4$, the resistor $R_{12}$, and the capacitor $C_6$ form a gate circuit having a functon of controlling the input supply to the time switch 2 in response to a signal from the voltage comparator circuit.

Resistors $R_5$ and $R_6$ serve to divide the output voltage of the rectifier circuit 1 to apply the divided voltage to the base of a transistor $Q_3$. The transistor $Q_3$ conducts so as to connect the junction of resistors $R_9$ and $R_{10}$ to the ground when the output voltage of the rectifier circuit 1 is relatively high to thereby stop the bias voltage supply to the transistor $Q_4$. A capacitor $C_4$ serves to delay the rise of the divided voltage.

The operation of the audio signal discriminator circuit of FIG. 1 will be described with reference to FIG. 2.

Figure 2A:
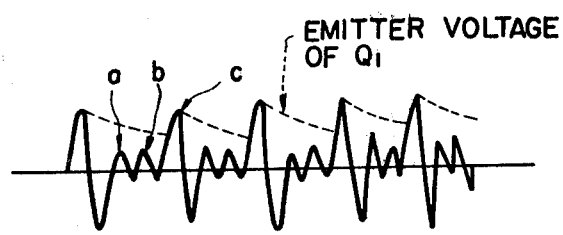
FIGS. 2(a) to 2(d) are signal waveform timing diagrams showing the operation of the circuit of FIG. 1.
Figure 2B:

First of all, when an audio signal as shown in FIG. 2a is applied to the rectifier circuit 1, the transistor $Q_1$ conducts at the first peak value and the capacitor $C_2$ is charged. It is common with audio signals that its high peak values rarely appear successively and the peak value following the first peak value is normally relatively low as shown by the letters (a) and (b), and thereafter a relatively high peak value (c) appears. Thus, the capacitor $C_2$ is gradually discharged through the resistor $R_2$ and the variable resistor VR and the voltage at the emitter of the transistor $Q_1$ charges as shown by the dotted lines. The small peaks (a) and (b) between the relatively high peaks are insufficient to turn on transistor $Q_1$ since the voltage hold circuit 3 maintains the emitter voltage at a higher potential than the base. Since $Q_1$ is not turned on by the relatively low peaks (a) and (b), the only drop in potential at the collector of $Q_1$ occurs at each relatively high peak. The occurrence of a high peak thus causes transistor $Q_2$ to turn on and supply a high voltage through resistor $R_8$ to the base of transistor $Q_4$. Also, the high peak value raises the potential at the junction of resistors $R_5$ and $R_6$ sufficiently to energize transistor $Q_3$, thus grounding the junction of resistors $R_9$ and $R_{10}$. This causes the transistor $Q_4$ to be turned on and off as shown in FIG. 2b.

Since the input of tone switch 2 is grounded only with each relatively high peak, the low peak values (a) and (b) are applied to the time switch 2 through the diode D and the resistor $R_{11}$ to thereby reset the time switch 2. This causes the time switch 2 to produce no output during the period of low peak values.

Figure 2C:
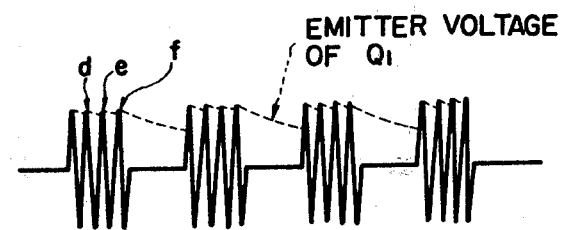
Figure 2D:

Beep tones are intermitted signals having a uniform level whose voltage wave form is illustrated in FIG. 2c. When such a beep tone is applied to the rectifier circuit 1, the transistor $Q_1$ conducts by every peak value (d, e, f) and the transistor $Q_4$ is turned on and off as shown in FIG. 2d by the smoothing operation of the capacitor $C_5$ so that the output of the rectifier circuit 1 is not applied to the time switch 2 and thus the time switch 2 produces its output a predetermined time later.

Dialed tones have a uniform level and frequency similar to beep tones. Therefore, when a beep tone is applied to the rectifier circuit 1, no reset signal is not applied to the time switch 2 so that the time switch 2 produces its output a predetermined time later. The same can be referred to howler tones.

When no signal is applied to the rectifier circuit 1, no reset signal is applied to the time switch 2 and the time switch 2 produces its output a predetermined time later.

As described above, the time switch 2 produces no output only when audio signals are applied to the rectifier circuit, whereby audio signals can be distinguuished from other signals.

It should be noted that although the signal passing through the diode D and the resistor $R_{11}$ is applied to the time switch 2 substantially without time delay, since the rise of the signal applied to the base of the transistor $Q_4$ becomes later than the rise of the peak voltage of the rectifier circuit output by the operation time of the transistors $Q_1$ and $Q_2$, there is the possibility of the reset pulse being applied to the switch 2 in spite of the conductive state of the transistor $Q_4$.

In order to eliminate the possibility, the capacitor $C_6$ is disposed to delay the rise of the signal fed from the resistor $R_{11}$ and also the resistors $R_9$ and $R_{10}$ are disposed to apply a bias voltage to the transistor $Q_4$ so as to restrict the rise of the signal fed from the resistor $R_{11}$.

Since it is preferable to remove the bias circuit when the signal fed from the voltage comparator circuit is applied to the transistor $Q_4$, the transistor $Q_3$ is disposed to connect the junction of the resistors $R_9$ and $R_{10}$ to the ground in that case. The capacitor $C_4$ is disposed in parallel with the resistor $R_6$ to delay the conduction of the transistor $Q_3$ in order to prevent the earlier conduction of the transistor $Q_3$.

Figure 3:
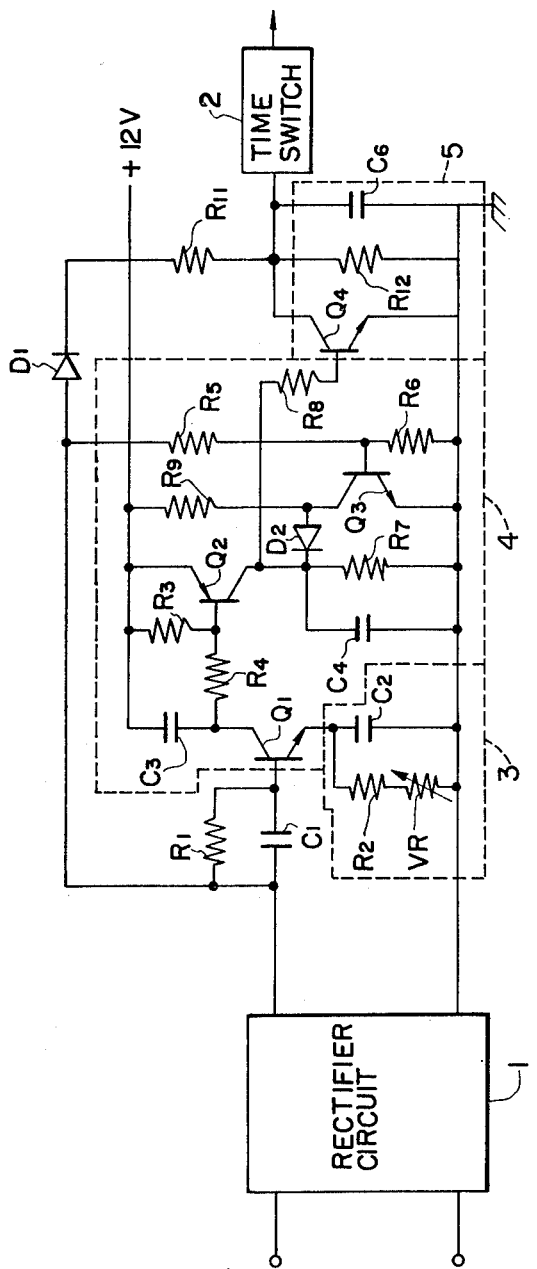
FIG. 3 is a circuit diagram showing an alternative embodiment of the present invention.

FIG. 3 illustrates an alternative embodiment of the present invention which differs from the first embodiment shown in FIG. 1 only in the circuit for applying a bias voltage to the transistor and thus like parts are designated by like reference characters.

In this embodiment, the bias current supply to the transistor $Q_4$ is effected through a diode $D_2$ and a resistor $R_8$ and the capacitor $C_4$ are connected in parallel with the resistor $R_7$ to delay the rise of the bias circuit grounding circuit.

As illustrated and described hereinbefore, the audio signal discriminator circuit of the present invention utilizes the difference in peak level change mode among input signals to control the operation of the time switch which can certainly distinguish audio signals from other signals such as dialed tones, beep tones, howler tones, etc.

What is claimed is:

1. An audio signal discriminator circuit comprising a rectifier circuit for rectifying input signals, a voltage hold circuit for holding a peak voltage applied from said rectifier circuit, a voltage comparator circuit for comparing the peak voltage held in said voltage hold circuit with the following peak voltages received from said rectifier circuit to produce an output signal when a following peak voltage is relatively high, a time switch for producing an output signal when no reset signal is applied thereto for a predetermined time period, and a gate circuit for transmitting the output signal of said rectifier circuit as a reset signal to said time switch in response to the absence of an output signal of said voltage comparator circuit, said gate circuit inhibiting the passage of said reset signal upon receiving said output signal.

2. An audio signal discriminator circuit as set forth in claim 1, wherein said hold circuit comprises a charge and discharge circuit composed of a capacitor and a discharge resistor for gradually discharging the charge stored in said capacitor.

3. An audio signal discriminator circuit as set forth in claim 2, wherein said voltage comparator circuit comprises a first transistor conducting when it receives from said rectifier circuit a voltage higher than the voltage stored in said charge and discharge circuit, and a second transistor conducting when said first transistor conducts and the output voltage thereof is applied to said gate circuit.

4. An audio signal discriminator circuit as set forth in claim 1, wherein said gate circuit comprises a resistor connecting the output terminal of said rectifier circuit to said time switch and a third transistor responsive to the output signal of said voltage comparator circuit to connect the time switch side terminal of said resistor to ground.

5. An audio signal discriminator circuit as set forth in claim 4, which further comprises a bias circuit for applying a constant bias to said third transistor.

6. An audio signal discriminator circuit as set forth in claim 4, which further comprises a capacitor for by-passing said third transistor.

7. An audio signal discriminator circuit as set forth in claim 5, which further comprises a bias stopping circuit responsive to a relatively high peak voltage from said rectifier circuit to connect said bias circuit to ground so as to stop the supply of a bias voltage to said third transistor.

8. An audio signal discriminator circuit as set forth in claim 7, wherein said bias stopping circuit comprises a voltage divider circuit for dividing the output voltage of said rectifier circuit, a fourth transistor responsive to the divided voltage of said voltage divider circuit to conduct when said rectifier output exceeds a predetermined value, and a capacitor connected in parallel to the output terminal of said voltage divider circuit.

* * * * *